United States Patent [19]

Stock

[11] 4,272,115
[45] Jun. 9, 1981

[54] FREE-MOVING BUMPER FINISHER

[75] Inventor: Malcolm G. Stock, Nantwich, England

[73] Assignee: Rolls-Royce Motors Limited, Crewe, England

[21] Appl. No.: 956,044

[22] Filed: Oct. 31, 1978

[30] Foreign Application Priority Data

Nov. 10, 1977 [GB] United Kingdom ............... 46783/77

[51] Int. Cl.³ ............................................. B60R 19/04
[52] U.S. Cl. .................................................. 293/155
[58] Field of Search ............................... 293/150–155, 293/102, 135, 138

[56] References Cited

U.S. PATENT DOCUMENTS

| | | | |
|---|---|---|---|
| 3,655,231 | 4/1972 | Killea, Jr. | 293/155 X |
| 3,820,834 | 6/1974 | Wilfert et al. | 293/150 |
| 3,845,977 | 4/1974 | Eshelmann | 293/155 X |
| 3,853,344 | 12/1974 | Shimoe | 293/155 X |
| 3,927,907 | 12/1975 | Bialek | 293/135 |
| 4,003,594 | 1/1977 | Tommeraas | 293/155 X |
| 4,061,386 | 12/1977 | Chupick | 293/135 X |
| 4,145,077 | 3/1979 | Haberle et al. | 293/102 |

*Primary Examiner*—John J. Love
*Assistant Examiner*—Norman L. Stack
*Attorney, Agent, or Firm*—Cushman, Darby & Cushman

[57] ABSTRACT

A bumper assembly for a vehicle comprises a center section adapted to lie along the width of the vehicle and two side sections connected to respective ends of the center section and adapted to lie along respective sides of the vehicle. Each section has a supporting metal beam and a superposed polyurethane moulding. The center section additionally has a superposed decorative steel finisher connected to the beam in a relatively displaceable manner. The side sections are connected at their ends remote from the center section by spring pivotal radius arms to the vehicle body. In the event of an impact, the side sections pivot away from the vehicle body on their radius arms against the action of the associated springs and the metal beam moves relative to the finisher against the action of a further spring. On removal of the impact force the parts of the assemby return to their original positions under the action of the various springs.

10 Claims, 5 Drawing Figures

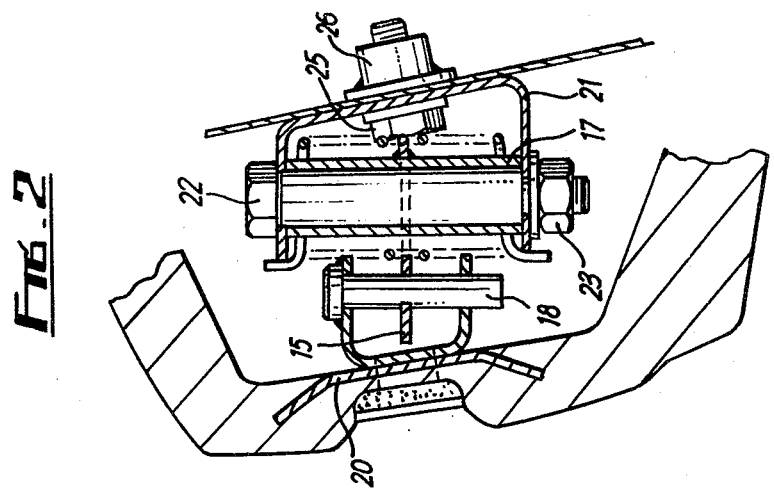
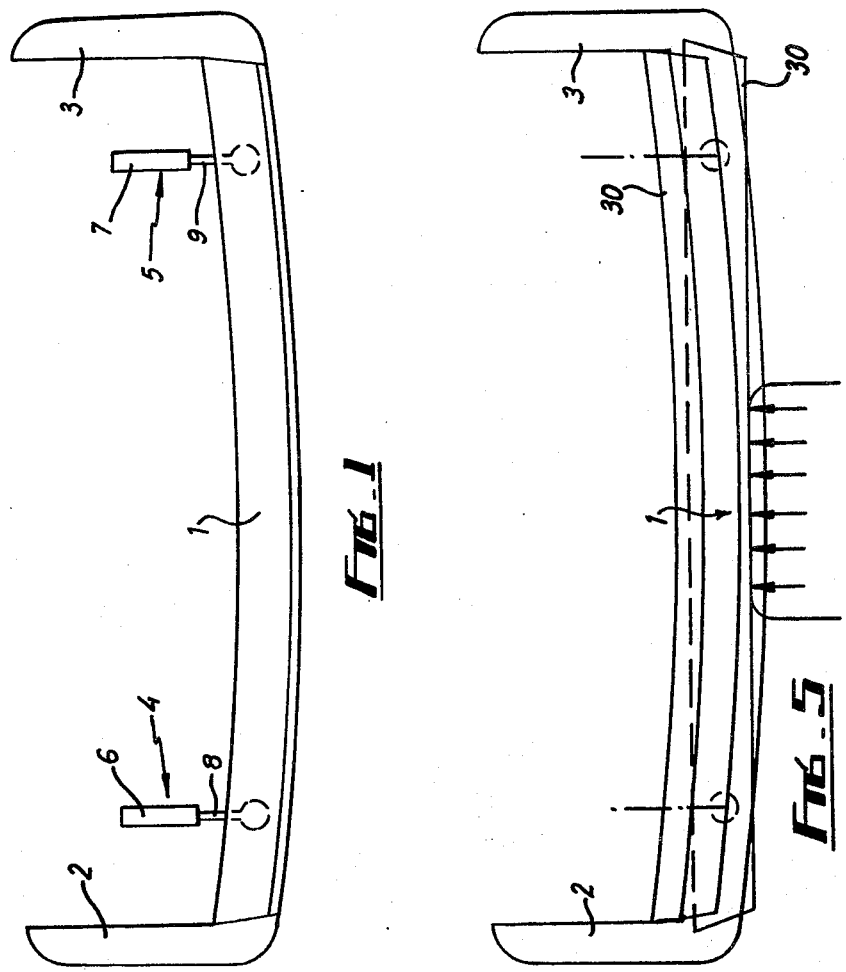

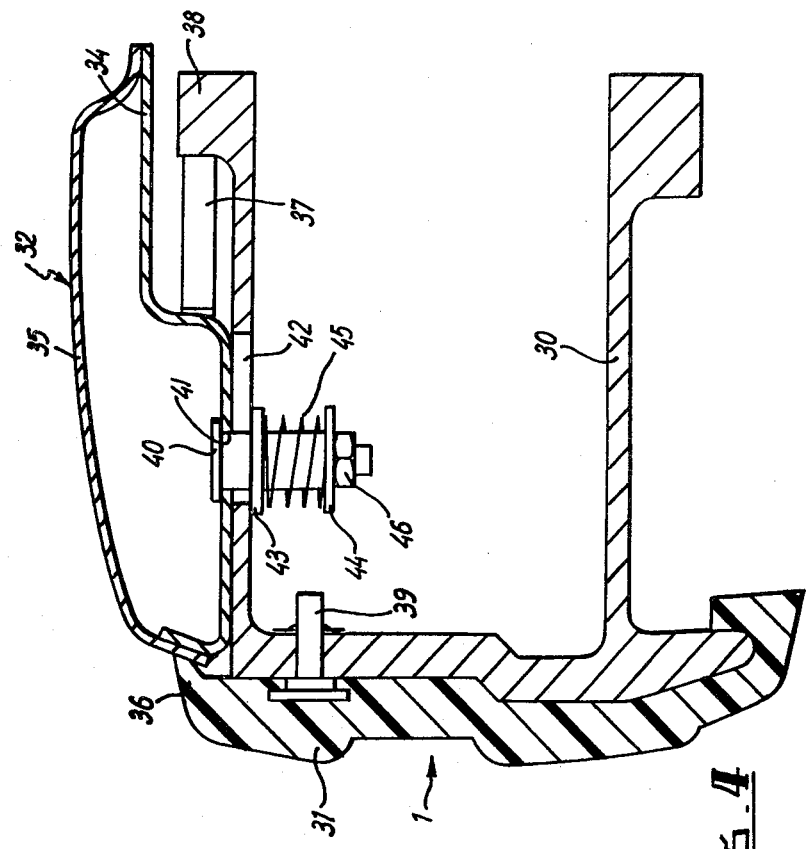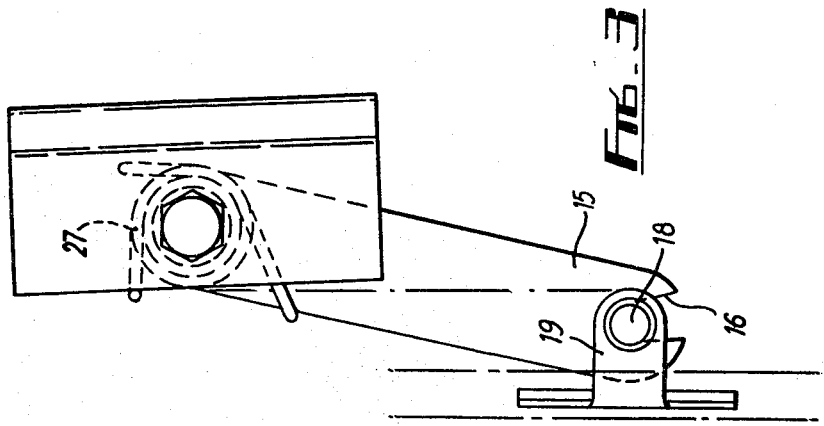

FREE-MOVING BUMPER FINISHER

The present invention relates to a bumper arrangement for a vehicle.

In a known bumper arrangement, an extruded strong metal beam supports a combined moulded synthetic plastics material and metal decorative finisher. The metal beam is designed to withstand impacts without permanent damage up to 5 m.p.h. with a fixed barrier and up to 2.5 m.p.h. caused by a swinging pendulum having a mass equal to that of the vehicle. In the known arrangement the metal of the beam is aluminium and the metal of the decorative finisher is chromium plated steel. As the beam and finisher are connected together both are subject to the same bend deflection on impact. The critical requirement for the beam is that it will withstand the bending stress of the impacts mentioned above but the problem is that if the decorative finisher is subjected to that degree of bending it is permanently buckled. If this happens the permanent damage is almost as bad as if the bumper as a whole had not withstood the required impact. The present solution to this problem is to stiffen the beam so that the bending deflection to which the decorative finisher is subjected is within that which its natural resilience can accommodate. Such a solution adds unnecessary weight to the bumper arrangement with all the attendant disadvantages which this has on the performance of the vehicle.

According to one aspect of the present invention, there is provided a bumper arrangement for a vehicle comprising a supporting metal beam and a superposed decorative finisher, the finisher being connected to the beam such that when the arrangement is subjected to an impact the finisher moves bodily relative to the beam in the general direction in which the force of the impact is applied.

According to another aspect of the present invention, there is provided a vehicle comprising a bumper arrangement as specified above.

A preferred embodiment of the invention may comprise any one or more of the following advantageous features.

(a) The finisher is resiliently clamped to the beam.

(b) The resilient clamping comprises one or more bolts each extending through the finisher and beam and each being spring loaded to urge the beam and finisher together, the point in the beam or finisher through which the bolt extends being slotted to allow relative movement between them.

(c) The or each spring of (b) is helical or rubber and is constrained to act between two flanges surrounding the corresponding bolt, one of the flanges abutting the beam and the other a nut screwed onto the end of the bolt.

(d) A synthetic plastics material moulding is fixed to the front of the beam.

(e) The finisher abuts a lip on the moulding of (d) and a spring device is disposed between the moulding and the flange on the beam to urge the finisher into contact with the moulding.

In order that the invention may be more clearly understood, one embodiment of the invention will now be described, by way of example, with reference to the accompanying drawings, in which:

FIG. 1 shows a plan diagrammatic view of a rear bumper arrangement for a vehicle, FIG. 2 is a detailed view of part of the arrangement of FIG. 1, FIG. 3 is a detailed view of a further part of the arrangement of FIG. 1, FIG. 4 is a cross section through the centre section of the bumper arrangement of FIG. 1, and FIG. 5 diagrammatically illustrates the relative movement of parts of the centre section of the bumper arrangement of FIG. 1 when the arrangement is subjected to an impact.

Referring to FIG. 1, the rear bumper arrangement comprises a centre section 1 and two side sections 2 and 3 extending substantially at right angles from opposite ends respectively of the centre section 1. Each section comprises a supporting metal beam or member and a superposed polyurethane moulding. The centre section is connected to the chassis or a main support member of the vehicle through two spaced energy absorbing units 4 and 5. Each of the units 4, 5 comprises a cylinder 6, 7 and a piston 8, 9. The cylinder 6, 7 is connected to the chassis and the piston 8, 9 is bolted to the bumper main beam or to a bracket connected to it.

Each side section 2, 3 is connected at one end to the adjacent end of the centre section 1 and at or near its other end to the body of the vehicle. The connection at this other end comprises a radius arm 15 which is slotted at 16 at one of its ends and welded at its other end to a pivot tube 17. The slot 16 receives a pin 18 brazed to a link bracket 19 fixed to a reinforcing plate 20 in the side moulding. At the other end of the radius arm 15, the pivot tube 17 is aligned with apertures formed in the arms of the U of a U-shaped bracket 21. A threaded bolt 22 is inserted through the apertures and pivot tube 17 and fixed in position by a complementary screwthreaded nut 23. The U-shaped bracket 21 has two apertures drilled in its base. These apertures are aligned with corresponding apertures drilled in the body of the vehicle and two threaded bolts 25 are inserted through respective pairs of aligned apertures and screwed into complementary tapped blocks 26 disposed on the inside of the vehicle body. The radius arm 15 which, with its pivots, is housed within the polyurethane moulding of the side section in its rest position is urged in towards the side of the vehicle by means of a torsion spring 27 thus holding the side section in towards the vehicle side. This spring 27 is concentrically disposed around the pivot tube 17 and its ends are constrained by radius arm 15 itself and the bracket 21.

In operation, when the bumper arrangement is subjected to an impact force on its centre section 1 causing it to move into the vehicle body, the side sections, being connected to the centre section move in the direction of the longitudinal axis of the vehicle relative to the vehicle body. This relative movement in turn causes the radius arms 15 to pivot out from the side of the vehicle body so that the ends of the side sections 2 and 3 clear the vehicle body and do not damage it. When the impact force is removed the energy stored in the springs pulls the side sections 2 and 3 back into the sides of the vehicle body as the centre section 1 is returned to its original position by the units 4 and 5. There is sufficient flexibility in the side sections 2 and 3 themselves to enable them to be deflected about the points at which they are connected to the centre section 1.

Referring to FIG. 4, the centre section 1, which as already mentioned comprises a supporting metal (aluminium) beam 30 and superposed hard polyurethane moulding 31, is constructed to allow relative movement between the beam 30 and or decorative steel finisher 32 which overlies the aluminium beam 30. The finisher 32 comprises an underlying support piece 34 and overlying decorative piece 35 and is constrained between a lip 36 of the hard polyurethane moulding 31 and a spring device 37 which abutts a flange or web 38 formed on the aluminium beam 30.

The moulding 31 is fixed to the aluminium beam 30 by means of pins 39 and the finisher 32 is clamped to the beam disposed below it by means of a spring loaded bolt 40. Each such bolt extends through an aperture 41 formed in the piece 34, a corresponding slot 42 formed in the beam 30, two flanges 43 and 44 and a spring device 45 constrained between the flanges 43 and 44 and a nut 46. The force with which the finisher 32 and beam 30 are clamped together may be varied by appropriate selection and/or degree of compression of the spring 45.

In operation when the centre section 1 is subjected to the force of an impact such as is diagrammatically illustrated in FIG. 5, the curved beam 30 and moulding 31 deflect but the finisher 32 retains its shape by sliding away from the impact, the bolts 40 sliding in the slots 42. When the impact force is removed the beam and moulding return to their original shapes due to their natural resilience and the compressed spring device 37 pushes the finisher 32 back to its original position, the bolts 40 again sliding in the slots 42.

It will be appreciated that the above embodiments have been described by way of example only and that many variations are possible without departing from the scope of the invention claimed.

What is claimed is:

1. A bumper arrangement for attachment to a body of a vehicle comprising:
   a supporting metal beam extending transversely of the body for receiving a force from an impact;
   a decorative finisher carried by said supporting metal beam in superposed relationship thereto; and
   means connecting said finisher to said supporting metal beam for bodily movement of the finisher relative to said beam in a general direction of the force of impact when applied to the beam, said connecting means comprising at least one bolt extending through said finisher and said beam, said bolt being spring loaded by a spring to urge said beam and finisher together, and at least one of said beam and said finisher at a point through which said bolt extends having a slot to allow relative movement between said finisher and said beam.

2. A bumper arrangement as claimed in claim 1, in which said spring is constrained to act between two flanges surrounding the said bolt, one of said flanges abutting the beam and the other of said flanges being a nut screwed onto the end of the bolt.

3. A bumper arrangement as claimed in 1, in which a synthetic plastic material moulding is fixed to the front of the beam.

4. A bumper arrangement as claimed in claim 3, in which said moulding is provided with a lip which abuts said finisher and a spring device disposed between said finisher and a flange on the beam for urging the finisher into contact with the lip on the moulding.

5. A bumper arrangement for attachment to a body of a vehicle comprising:
   a supporting metal beam extending transversely of the vehicle and having an upper surface, a lower surface and a surface facing outwardly of the body of the vehicle, said metal beam having a predetermined resiliency enabling it to return to its original shape after receiving a predetermined force from an impact;
   a decorative finisher carried by said supporting metal beam on the upper surface thereof in superposed relationship thereto, said decorative finisher having less resiliency than said predetermined resiliency of said metal beam;
   means connecting said decorative finisher to said supporting metal beam for sliding bodily movement of said decorative finisher relative to said beam in a general direction of a force of impact when applied to said metal beam; and
   resilient means between said beam and said decorative finisher normally urging said decorative finisher toward the outwardly facing surface of said beam to a predetermined position on said beam, said resilient means being capable of returning said decorative finisher to said predetermined position after a force causing sliding bodily movement of said finisher relative to said metal beam is removed.

6. A bumper arrangement as claimed in claim 5, in which connecting means comprises at least one bolt extending through the finisher and the beam, said bolt being spring loaded by a spring to urge the beam and finisher together, and at least one of said beam and said finisher at a point through which said bolt extends having a slot to allow relative movement between said finisher and said beam.

7. A bumper arrangement as claimed in claim 5 in which said metal beam is aluminum and said decorative finisher is chrome plated steel.

8. A bumper arrangement as claimed in claim 6, 5 or 7 including a synthetic plastic material molding fixed to said outwardly facing surface of said beam.

9. A bumper arrangement as claimed in claim 6, 5 or 7 in which said resilient means between said bumper and said decorative finisher is a spring device and including stop means carried by said metal beam upon which said decorative finisher abuts when urged by said spring device to the predetermined position.

10. A bumper arrangement as claimed in claim 9 including a synthetic plastic molding fixed to said outwardly facing surface of said beam, said stop means including a lip integrally formed on said molding.

* * * * *